(No Model.) 4 Sheets—Sheet 1.
P. DIEHL.
ELECTRIC MOTOR FAN.
No. 414,758. Patented Nov. 12, 1889.
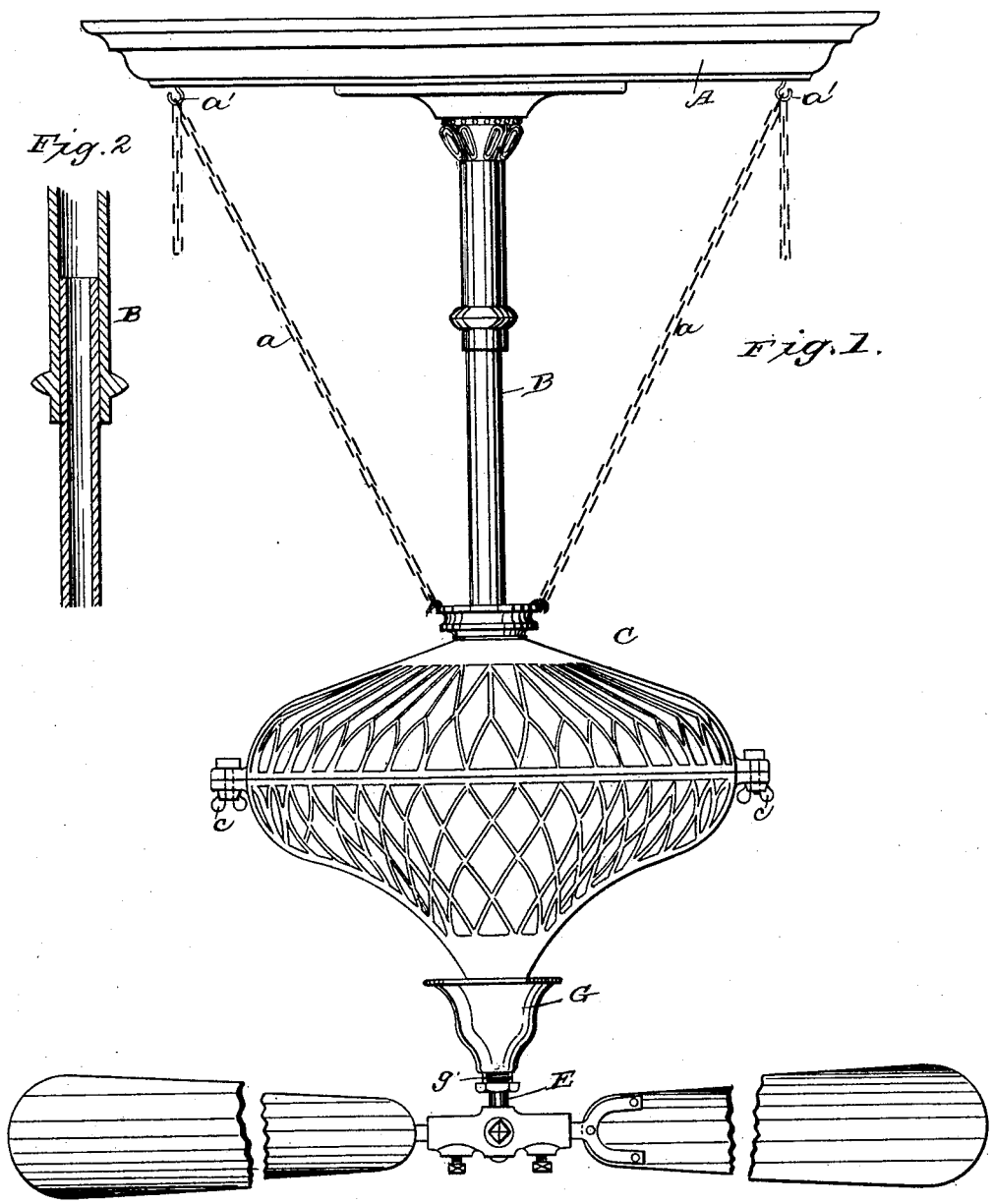
WITNESSES:
INVENTOR
Philip Diehl,
BY Henry Calver
his ATTORNEY (No Model.) 4 Sheets—Sheet 2.
P. DIEHL.
ELECTRIC MOTOR FAN.
No. 414,758. Patented Nov. 12, 1889.
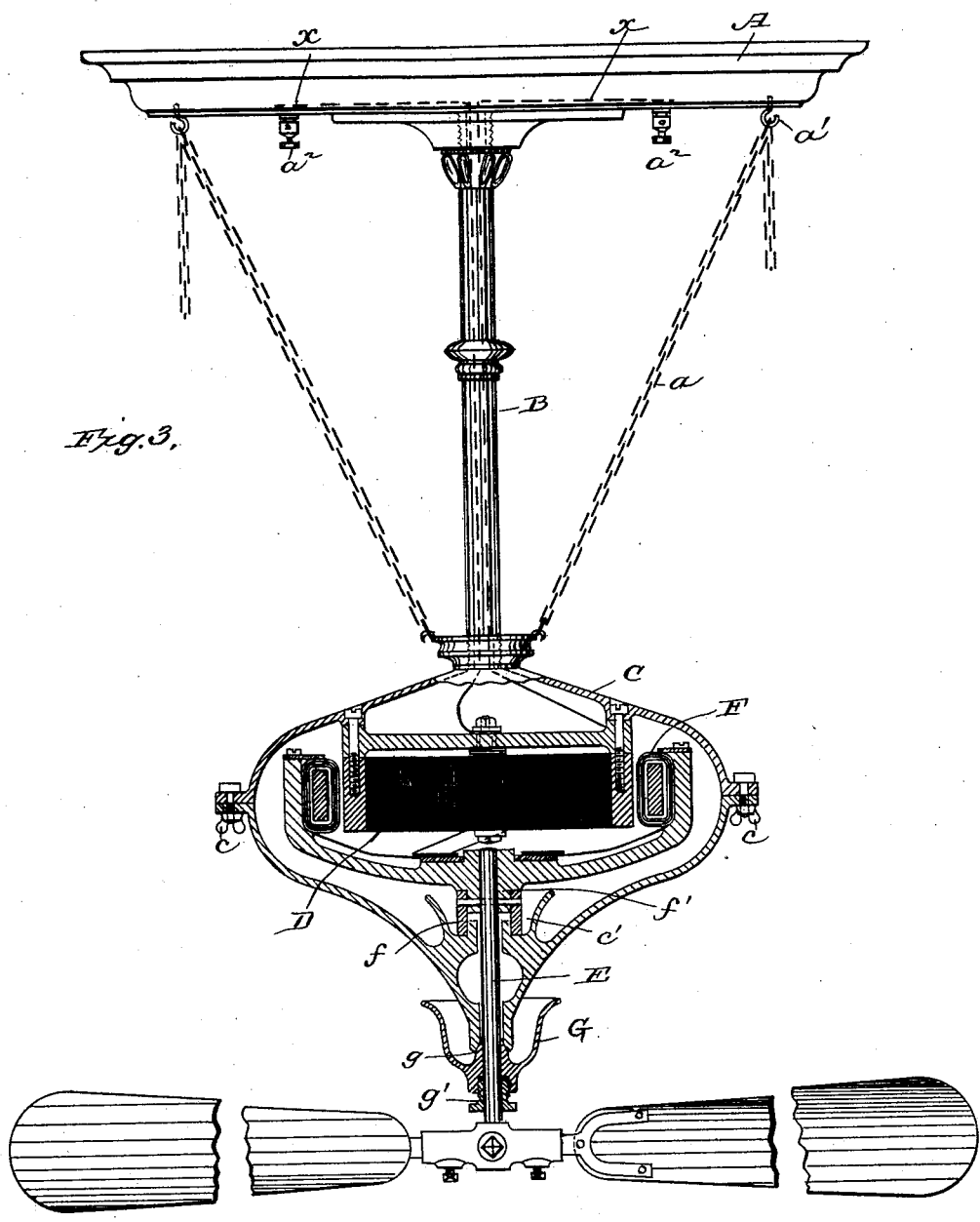
WITNESSES:
INVENTOR
Philip Diehl
BY
his ATTORNEY (No Model.) 4 Sheets—Sheet 3.
P. DIEHL.
ELECTRIC MOTOR FAN.

No. 414,758. Patented Nov. 12, 1889.

WITNESSES:

INVENTOR
Philip Diehl,
BY
his ATTORNEY (No Model.) 4 Sheets—Sheet 4.

P. DIEHL.
ELECTRIC MOTOR FAN.

No. 414,758. Patented Nov. 12, 1889.

WITNESSES:

INVENTOR
Philip Diehl
BY
his ATTORNEY

UNITED STATES PATENT OFFICE.

PHILIP DIEHL, OF ELIZABETH, NEW JERSEY.

ELECTRIC-MOTOR FAN.

SPECIFICATION forming part of Letters Patent No. 414,758, dated November 12, 1889.

Application filed August 12, 1889. Serial No. 320,486. (No model.)

*To all whom it may concern:*

Be it known that I, PHILIP DIEHL, a citizen of the United States, residing at Elizabeth, in the county of Union and State of New Jersey, have invented certain new and useful Improvements in Electric-Motor Fans, of which the following is a specification, reference being had therein to the accompanying drawings.

My invention has for its object to provide an electric motor which may be cheaply constructed and which is more particularly intended for running a rotary fan, the parts of the motor being so arranged that they can be conveniently assembled or taken apart. I also so construct and arrange the parts of the device constituting the complete electric fan that the fan proper may be at any desired height, regardless of the height of the ceiling from which it is to be suspended, and at the same time have the fan-carrying shaft so short that it will have but little weight, and consequently cause but little friction; and still another object of my invention is to prevent any dripping of the lubricating-oil.

Figure 4:
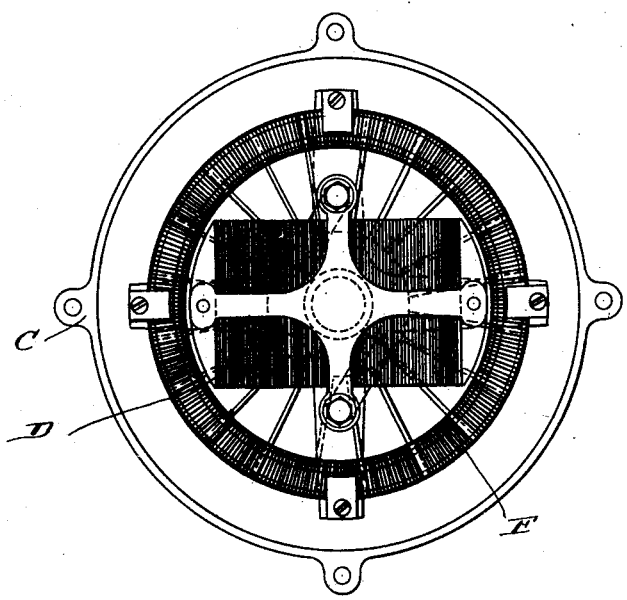
Figure 5:
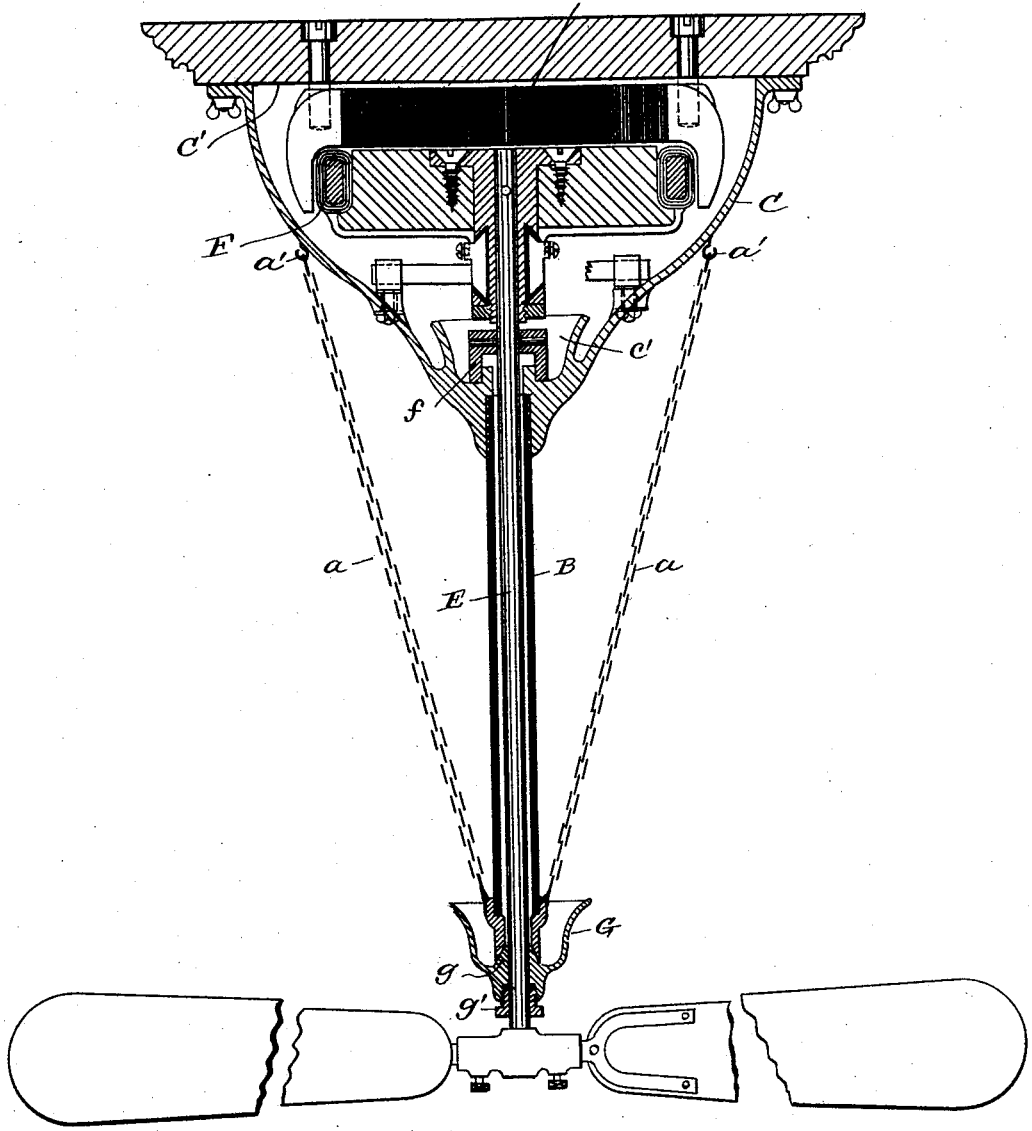

In the accompanying drawings, Figure 1 is an elevation of my improved electric fan. Fig. 2 is a detail sectional view to show the extensible telescopic supporting-rod. Fig. 3 is an elevation, partly in vertical section, of my device. Fig. 4 is a top view of the field-magnet, the armature, and the lower part of the bracket; and Fig. 5 is a sectional elevation illustrating a modification.

A denotes a base-piece or support to be attached to a ceiling, and to which is secured in any proper manner the supporting-rod B, to the lower end of which the motor-containing bracket C is attached. This bracket C is preferably made in the form of an open-work basket, as shown in Fig. 1, constructed in two parts, which are removably secured together by thumb-screws $c$.

My improved motor comprises a suspended field-magnet D, composed of a single-wound core, said magnet being preferably attached to the upper portion of the separable bracket C.

E is the vertical fan-shaft, to the upper end of which is attached the armature F, herein shown in Figs. 3 and 4 as a Gramme ring surrounding the stationary field-magnet.

The bracket C is provided with a cupped bearing $c'$, adapted to contain a quantity of lubricant, and in which rests a bearing hub or ring $f$, attached to the hub $f'$ of the armature.

To the shaft E, below the bracket C, is attached an oil-cup G, preferably having a conical hub $g$, fitting a conical recess in the bottom of the hub of said bracket. To prevent any leakage of oil from the oil-cup G, the latter is provided at its bottom with a stuffing-box consisting of the hollow screw $g'$, surrounding the fan-carrying shaft and entering a recess in the bottom of said cup, said recess containing some soft packing material, which is compressed as the screw is tightened, thus making a close joint in the bottom of the cup around the shaft and securing the cup to the latter. The oil-cup receives the lubricant which comes down from the cupped bearing and keeps the lower cone-bearing oiled.

The fan is adapted to ceilings of different heights or to be suspended at any desired height above the floor by using supporting-rods B of different lengths, or by making said rods telescopic, so that one section or part thereof may slide within the other, as shown in Fig. 2, the bracket C being held in any desired position by steadying-chains $a$, attached to said bracket and to hooks $a'$ on the support A, said hooks engaging different links of said chain when the height of the fan is varied.

In the modification shown in Fig. 5 the armature F is shown as being arranged inside of the poles of the single-wound field-magnet D, instead of being outside of the poles of said magnet, as in Figs. 3 and 4, said magnet being attached or suspended from the part C' of the motor-bracket, and to which the part C or bracket proper is removably secured. By attaching the magnet to a part which is separable from the part by which the armature is carried the part of the motor which is removed in obtaining access to its interior is much lighter than when the magnet is a part of the removable portion, and by making the magnet of a single continuously-wound body or core its construction is considerably cheapened.

Owing to the very short fan-carrying shaft which I am enabled to use with the supporting-rod B (which brings the motor-bracket down nearly to position desired for the fan) the weight of the shaft is so little that there is but little friction on the running parts. The current is led to the motor through conductors $x$, attached to the binding-screws $a^2$, and passing down the interior of the hollow supporting-rod B, as denoted by dotted lines in Fig. 3.

I claim—

1. The combination, with the armature of an electric motor, a shaft to which said armature is attached, and a support in which said shaft has its bearings, of a field-magnet consisting of a single continuously-wound core or body, and a support from which said magnet is suspended and which is separate from but detachably connected with the support for the armature-shaft.

2. In an electric motor, the combination, with a bracket consisting of two separable parts, of a driven shaft having bearings in one of said parts, a rotating armature attached to said shaft, and a stationary field-magnet attached to or suspended from the other part of the said bracket.

3. In an electric motor, the combination, with a bracket consisting of two separable parts, of a driven shaft having bearings in one of said parts, a rotating armature attached to said shaft, and a stationary field-magnet attached to or suspended from the other part of said bracket, said magnet consisting of a single continuously-wound core or body.

4. The combination, with the bracket C, the short fan-carrying shaft journaled therein, the armature attached to said shaft, and the stationary field-magnet, also within said bracket, of the supporting-rod B, to the lower end of which said bracket is attached.

5. The combination, with the bracket C, the short fan-carrying shaft journaled therein, the armature attached to said shaft, and the stationary field-magnet, also within said bracket, of the supporting-rod B, to the lower end of which said bracket is attached, said rod being made telescopic or extensible to vary its length, as may be necessary.

6. The combination, with the supporting-bracket, the vertical fan-carrying shaft, its attached armature, and the stationary field-magnet, of the oil-cup attached to said shaft below said bracket and provided with a stuffing-box to prevent leakage of oil.

7. The combination, with the supporting-bracket, the vertical fan-carrying shaft, its attached armature, and the stationary field-magnet, of the oil-cup attached to said shaft below said bracket and provided with a cone-bearing fitting a conical recess in said bracket.

In testimony whereof I affix my signature in presence of two witnesses.

PHILIP DIEHL.

Witnesses:
JAMES G. GREENE,
L. B. MILLER.